US008574422B2

(12) United States Patent
Beech et al.

(10) Patent No.: US 8,574,422 B2
(45) Date of Patent: Nov. 5, 2013

(54) HYDROGEN PRODUCTION

(75) Inventors: Philip Michael Beech, Oxfordshire (GB); Stuart Leigh Jones, Birmingham (GB); James Timothy Shawcross, Oxfordshire (GB)

(73) Assignee: Qinetiq Limited (GB)

( * ) Notice: Subject to any disclaimer, the term of this patent is extended or adjusted under 35 U.S.C. 154(b) by 986 days.

(21) Appl. No.: 12/295,344

(22) PCT Filed: Mar. 19, 2007

(86) PCT No.: PCT/GB2007/050132
§ 371 (c)(1),
(2), (4) Date: Sep. 30, 2008

(87) PCT Pub. No.: WO2007/116225
PCT Pub. Date: Oct. 18, 2007

(65) Prior Publication Data
US 2009/0272653 A1    Nov. 5, 2009

(30) Foreign Application Priority Data

Apr. 7, 2006  (GB) .................................. 0606943.9
Nov. 21, 2006  (GB) .................................. 0623159.1

(51) Int. Cl.

| C25B 1/02 | (2006.01) |
| C25B 1/00 | (2006.01) |
| C25B 3/00 | (2006.01) |
| C25C 1/00 | (2006.01) |
| C25C 3/00 | (2006.01) |
| B28B 19/00 | (2006.01) |
| B32B 13/00 | (2006.01) |
| C01B 3/26 | (2006.01) |

(52) U.S. Cl.
USPC ........... 205/637; 205/343; 156/348; 423/651

(58) Field of Classification Search
USPC .................. 205/637, 638, 343; 204/274, 273; 315/111.21; 156/348
See application file for complete search history.

(56) References Cited

U.S. PATENT DOCUMENTS

| 5,015,349 A | 5/1991 | Suib et al. |
| 5,131,993 A | 7/1992 | Suib et al. |

(Continued)

FOREIGN PATENT DOCUMENTS

| CA | 2379892 | 2/2001 |
| EP | 0 845 287 | 6/1998 |

(Continued)

OTHER PUBLICATIONS

Bromberg, et al., "Plasmatron Reformation of Renewable Fuels", MIT Plasma Science and Fusion Center, Sep. 30, 2005.

(Continued)

*Primary Examiner* — Bobby Ramdhanie
*Assistant Examiner* — Bryan Kilpatrick
(74) *Attorney, Agent, or Firm* — McDonnell Boehnen Hulbert & Berghoff LLP

(57) ABSTRACT

A process and apparatus are provided for producing hydrogen from a hydrocarbon fuel by combining the fuel with a gas comprising both oxygen and steam, and passing the resulting mixture through a plasma generated by a microwave plasma generator between opposed electrodes. At least one of the electrodes defines a duct for outflow of gaseous material from the vicinity of the plasma, and the gas mixture emerging from the outflow duct contains hydrogen. The fuel undergoes partial oxidation and steam reforming, the reactions being initiated by the plasma rather than by a catalyst.

12 Claims, 2 Drawing Sheets

(56) References Cited

U.S. PATENT DOCUMENTS

| | | | |
|---|---|---|---|
| 5,418,430 A * | 5/1995 | Bayliss | 315/111.21 |
| 5,887,554 A | 3/1999 | Cohn et al. | |
| 6,126,779 A * | 10/2000 | Gillespie et al. | 156/348 |
| 6,245,309 B1 | 6/2001 | Etievant et al. | |
| 6,322,757 B1 | 11/2001 | Cohn et al. | |
| 6,651,597 B2 | 11/2003 | Daniel et al. | |
| 2004/0134126 A1 | 7/2004 | Vizoso et al. | |
| 2005/0123472 A1* | 6/2005 | Hall et al. | 423/651 |
| 2005/0210877 A1 | 9/2005 | Rabinovich et al. | |
| 2006/0124445 A1 | 6/2006 | Labrecque et al. | |

FOREIGN PATENT DOCUMENTS

| | | |
|---|---|---|
| EP | 1392087 | 2/2004 |
| GB | 2273027 | 6/1994 |
| JP | 2003-104705 | 4/2003 |
| JP | 2003-212502 | 7/2003 |
| JP | 2004-043271 | 2/2004 |
| WO | WO 01/09031 | 8/2001 |
| WO | WO 2004/033368 | 4/2004 |
| WO | WO 2004/085822 | 10/2004 |

OTHER PUBLICATIONS

Bromberg, "Startup Characteristics of Plasmatron Gasoline Reformers", MIT Plasma Science and Fusion Center, Dec. 15, 2005.

Demisky, et al., "Plasma-Assisted Production of Hydrogen From Hydrocarbons", Pure Appl. Chem., vol. 74, No. 3, pp. 413-418 (2002).

Written Amendments filed on Jul. 18, 2008 in Japanese Publication No. 2004-043271.

* cited by examiner ized power source. However this leads to a requirement for an efficient and correspondingly clean process for the production of hydrogen. It would be convenient if this could be produced from hydrocarbons that are currently widely available, for example through the existing distribution network for diesel fuel for internal combustion engines.

HYDROGEN PRODUCTION

BACKGROUND OF THE INVENTION (1) Field of the Invention

This is a Rule 371 application of PCT/GB2007/050132 filed on Mar. 19, 2007, which claims priority to GB0606943.9 filed on Apr. 7, 2006 and to GB0623159.1 filed on Nov. 21, 2006.

The present invention relates to a process and an apparatus for producing hydrogen from hydrocarbons, particularly but not exclusively long chain hydrocarbons such as diesel fuel.

(2) Description of the Art

Fuel cells consuming hydrogen and oxygen (from the air) offer the promise of providing a clean and efficient electrical power source. However this leads to a requirement for an efficient and correspondingly clean process for the production of hydrogen. It would be convenient if this could be produced from hydrocarbons that are currently widely available, for example through the existing distribution network for diesel fuel for internal combustion engines.

SUMMARY OF THE INVENTION

The present invention accordingly provides a process for producing hydrogen from a hydrocarbon fuel, the process comprising:
combining the fuel with a gas comprising oxygen and/or steam;
and passing the fuel and gas mixture through a plasma generated by a microwave plasma generator between opposed electrodes in a reactor, at least one of the electrodes defining a duct for outflow of material from the vicinity of the plasma; so that the gas mixture emerging from the outflow duct contains hydrogen,
wherein the fuel and the gas comprising oxygen and/or steam enter the reactor so as to form a swirl of fuel and gas mixture around the electrodes.

Preferably the fuel is combined with a gas comprising both oxygen and steam.

There are typically one or more gas/fuel inlets into the reactor. The gas and fuel enter the reactor so as to form a swirl of fuel and gas mixture around the electrodes. The swirling fuel and gas mixture causes the fuel and gas mixture to form a vortex at the centre of the cell between the two electrodes leading to good mixing of the fuel with the gas comprising oxygen and/or steam. In one embodiment of the present invention the fuel/gas inlets are tangential to the direction of motion of the fuel and gas mixture as it swirls around the electrodes. Thus, the fuel/gas inlets have a tangential component with respect to a circle centred on the longitudinal axis of the electrodes i.e. the inlet is in a direction which has a component at a non-zero angle to a line joining the inlet to the longitudinal axis of the electrode. Providing an outflow duct for the gas mixture through one of the electrodes aids the formation of a vortex in the reactor. In addition, removing the gas mixture through one of the electrodes lowers the gas pressure where the electrodes are at their closest approach. The lower gas pressure enables the plasma still to strike (initiate the discharge) and be sustained when the reactor is operated at atmospheric pressure or higher pressures, preferably the latter, for example a pressure of up to 7 atmospheres. A pressure of up to 2.3 atmospheres is particularly desirable when feeding the emerging gas mixture to a solid oxide fuel cell. Removing the gas mixture through one of the electrodes also increases the likelihood that the gases pass through the plasma as the entrance to the outflow duct is located in the plasma. This is an advantage of the present invention.

As the gas mixture passes into the outflow duct hydrogen reforming is typically still taking place such that there is typically a plasma tail in the outflow duct. The reactions continue in this tail which increases the yield of hydrogen. This yield can be further increased by placing a suitable reforming catalyst in the tailpipe if required.

It will be appreciated that the gas mixture emerging from the outflow duct will also contain other gases such as carbon monoxide, and possibly also carbon dioxide, and that it may be necessary to subject this emerging gas mixture to subsequent process steps. This clearly depends on the use to which the hydrogen is to be put. If the gas mixture is to be supplied to a polymer electrolyte membrane (PEM) fuel cell, then a mixture substantially free of carbon monoxide is required, whereas a solid oxide fuel cell (SOFC) could use a mixture of hydrogen and carbon monoxide directly. The emerging gas mixture consists primarily of hydrogen and carbon monoxide, which may be subjected to a "water gas shift reaction", i.e. reacting the carbon monoxide with steam, to generate additional hydrogen (and carbon dioxide). If necessary, any remaining carbon monoxide may be reacted with oxygen by a selective oxidation process. An alternative approach is to separate hydrogen from the carbon monoxide using a membrane such as a palladium alloy membrane.

The microwave reactor typically comprises an outer metal block acting as a containment vessel together with an inner replaceable insert of a material that is largely transparent to microwaves, easily moulded, machined or shaped and can be used at reforming temperatures, typically above 600° C. A suitable microwave transparent material is chosen depending on the temperature at which the reactor is operated. For example, PTFE (polytetrafluoroethene) is suitable at lower reforming temperatures and mica, alumina and quartz at higher temperatures. The inner part of the insert is machined to present a cylindrical chamber into which the fuel and gas mixture enters through one or more tangential gas inlets such that a swirl is induced within the fuel and gas mixture leading to a vortex as the gas exits through one of the paired electrodes located towards the centre of the insert. The microwave reactor may also be operated without the microwave transparent insert as the chamber, in which the insert usually fits, induces a swirl and can be profiled to enhance this effect.

The microwave plasma generator may provide microwave power continuously or in pulses. Using a pulsed microwave power supply has the advantage of reducing the total energy used by the process.

The effect of the plasma is to create free radicals, and to heat the gas, and hence to cause chemical reactions to occur more rapidly. There are two main reactions which occur: steam reforming, and partial oxidation. Steam reforming is an endothermic reaction, typically requiring temperatures above about 650° C.; the extent to which it is endothermic increases as the number of carbon atoms in the hydrocarbon increases, and moreover steam reforming tends to form carbon where polynuclear or olefinic components are present, as is usually the case when diesel fuel is used (unless the steam/carbon ratio is significantly greater than 2, which would reduce efficiency). Partial oxidation, in contrast, is an exothermic reaction. The products of partial oxidation depend on the ratio of fuel to oxygen: partial oxidation forms hydrogen and carbon monoxide if the proportion of oxygen is low, and forms water, carbon monoxide and carbon dioxide if the proportion of oxygen is higher. The use of a plasma for performing these reactions avoids the need to provide a catalyst, and enables the reactor to have a more rapid response time because there is significantly less thermal inertia.

For partial oxidation conditions, preferably the molar ratio of oxygen to carbon in the fuel and gas mixture is in the range 0.5 to 0.7, and the molar ratio of steam to carbon is between 1.5 and 2.0.

The fuel may be a liquid fuel such as kerosene, petrol (gasoline) or diesel fuel; and may comprise oxygenated compounds such as ethanol. For this purpose it may be appropriate to assume that diesel fuel is about C15. In practice diesel fuel is a complex mixture which may contain hundreds of different components. For example one type of diesel fuel has been found to have as its primary constituents about 14% 2-methyl tridecane, 14% n-hexadecane, 10% n-tridecane, and between 6% and 7% of each of tetramethylpentadecane, trimethyldodecane, butyl naphthalene, and propyl naphthalene and n-octyl benzene (these being molar proportions). The diesel fuel is preferably supplied to the microwave plasma generator in a vapour form.

A microwave plasma generator operates at very high frequencies, typically above 1 GHz, for example 2.45 GHz, and at such a high frequency the oscillations of the applied electric field are so rapid that only electrons can readily respond. The plasma that is formed is consequently far from local thermodynamic equilibrium, and so can operate at a wide range of pressures. In particular it can operate at around atmospheric pressure, or even at higher pressures (for example 3 or 7 atmospheres).

The present invention also provides a system comprising a microwave plasma reactor and a fuel cell wherein the microwave plasma reactor comprises a reaction chamber coupled to a microwave plasma generator, at least one pair of opposed electrodes in the reaction chamber and perpendicular to the direction of propagation of microwave radiation through the reaction chamber, one or more inlets for fuel and a gas comprising oxygen and/or steam in the chamber positioned so as to cause gas passing through the electrodes to form a swirl around the electrodes and at least one of the electrodes defining a duct for outflow of material from the vicinity of the plasma. In a preferred embodiment the gas inlets are in a direction tangential with respect to the electrodes or in a direction tangential to the direction of motion of the fuel and gas mixture in the reactor.

DESCRIPTION OF THE FIGURES

The process and the plant or apparatus of the invention will now be further and more particularly described, by way of example only, and with reference to the accompanying drawing in which.

DESCRIPTION OF THE INVENTION

Figure 1:
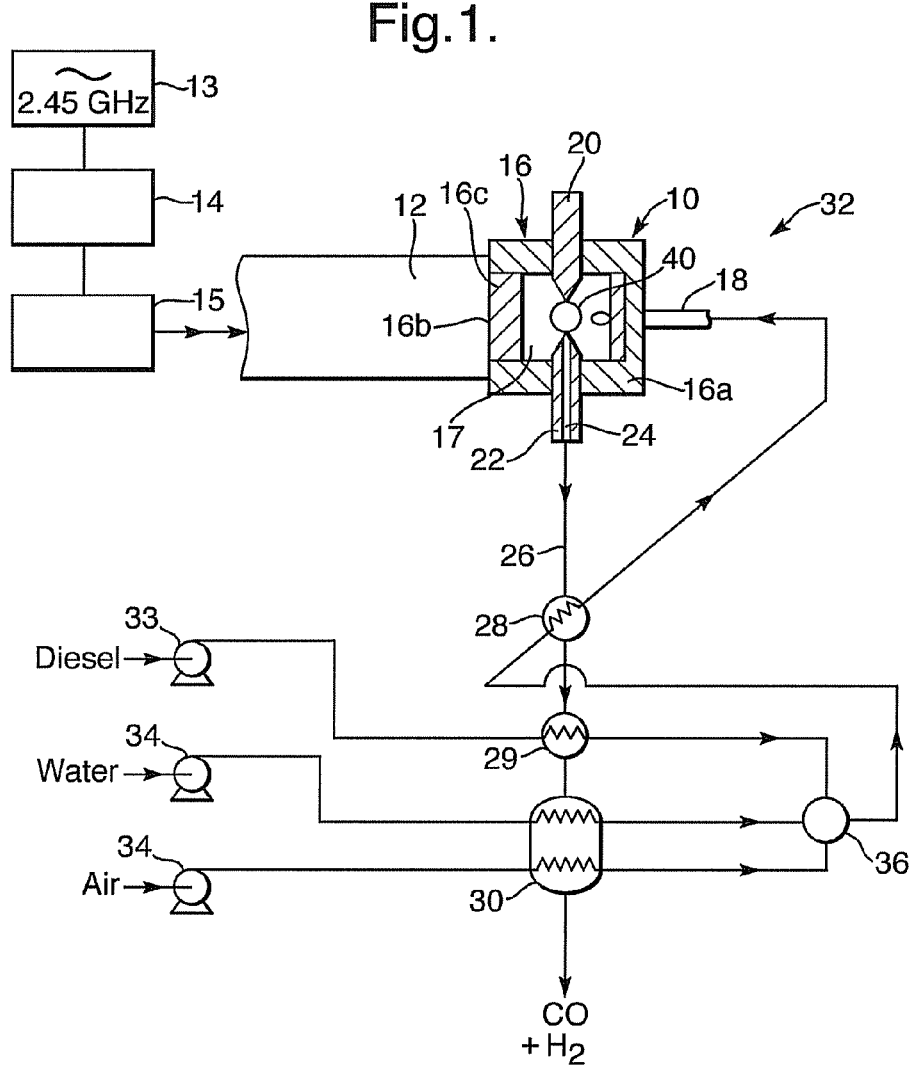
FIG. 1 shows a diagrammatic flow diagram of a hydrogen generating apparatus of the invention, incorporating a microwave plasma reactor shown in section.

Referring to FIG. 1 a microwave plasma reactor 10 comprises a microwave waveguide 12 at one end of which is a microwave generator 13 (shown diagrammatically) coupled to the waveguide 12 through a circulator 14 and a tuner 15, and at the other end of which is a chamber 16 for the chemical reactions. Alternatively the microwave can be coupled using a coaxial cable connection rather than waveguide. The chamber 16, in this example, consists of a rectangular steel box 16a of substantially the same cross-sectional shape as the waveguide 12, and with a microwave-transparent aperture 16b communicating with the waveguide 12; the opposite end of the box 16a is closed, so that the chamber 16 forms the end of the transmission path for the microwaves. This opposite end of the box 16a (closed end) can be in the form of a plate or sliding short to aid tuning of the plasma. Within the box 16a is an insert 16c of a material which is transparent to microwaves (such as PTFE or silica) defining a cylindrical cavity 17 provided with a tangential gas inlet duct 18. The general shape and arrangement of the reaction chamber is similar to that described in GB 2 273 027. The top and bottom walls of the box 16a support a pair of electrodes 20 and 22 with conically tapered ends facing each other, on the longitudinal axis of the cylindrical cavity 17. One of the electrodes 22 defines an exit duct 24 along its longitudinal axis. This electrode 22 (and so the outflow duct 24) extends to outside of the reaction chamber 16, and communicates with an outlet duct 26 for the hydrogen-containing gases that are formed. The electrodes 20 and 22 act to focus the electric component of the microwave field such that microwave energy is maximized between the electrodes at the centre of the cavity 17. The electrodes are designed so that a good contact is made with the block 16. The outlet duct 26 passes through heat exchangers 28, 29 and 30 in succession (which in practice may be integrated into a single unit).

The microwave plasma reactor 10 forms part of a hydrogen-generating apparatus 32. Diesel fuel is supplied by a pump 33 through the heat exchanger 29 to reach a temperature of about 400° C. so that it evaporates, and the vapour is supplied to a mixing unit 36. Water and air are supplied to the mixer unit 36 by respective pumps 34 through respective channels through the heat exchanger 30 so that each is at a temperature of about 400° C., so that the water is in the form of steam. The resulting gas/vapour mixture is then further heated by passing through the heat exchanger 28, and is then fed (for example at 400° C.) into the inlet duct 18 of the reaction chamber 16. Alternatively, the diesel fuel may be heated to about 550° C. Where PTFE is used as the insert or aperture material, the fuel and gas mixture entering the reactor must not exceed 200° C. It is appreciated that at elevated input temperatures the diesel, air and or steam may be mixed in alternative combinations to avoid auto ignition or uncontrolled combustion.

In operation, the hot gas mixture flowing through the outlet duct 26 consists primarily of hydrogen, carbon monoxide and excess steam (as discussed below), and nitrogen from the air. It can be fed to a water gas shift unit (not shown) where the excess steam reacts with the carbon monoxide to provide more hydrogen.

In use of the microwave plasma reactor 10, with the generator 13 generating microwaves at 2.45 GHz, the electrodes 20 and 22 are initially brought close enough together that the voltage induced between the electrodes by the microwaves is sufficient to strike a discharge and to form a plasma. The electrodes 20 and 22 are then moved a short distance apart, so as to minimise thermal erosion, while maintaining a ball 40 of plasma between the ends of the electrodes 20 and 22. The gas mixture introduced through the duct 18 swirls around the inside of the cavity 17 and then passes through the plasma ball 40, to emerge through the outlet duct 26. Typically the microwave generator 13 might generate at least 300 W of microwave power, and the tuner 15 is used to maximise the microwave power between the electrodes 20 and 22, while minimising the reflected power in the waveguide 12.

The pressure within the cavity 17 is typically between 1 atmosphere and 3 or 4 atmospheres (absolute values), and a plasma at such a pressure has a comparatively high electron temperature and a moderately high particle temperature. The bulk temperature within the plasma 40 can be expected to be in the range between 1000 K and 4000 K. The effect of the microwaves is both to act as a heating device and also to generate electrons, ions and free radicals. The effect of the plasma ball 40 will in practice depend on the microwave power that is supplied, on the proportions of the reactants air, diesel fuel and water, and on their temperature and flow rate.

Experiments have been carried out on a hydrogen-generating apparatus 32 as shown in FIG. 1, differing only in that the gas/vapour mixture is not heated after the mixer unit 36, but is instead supplied at about 200° C. to the microwave plasma reactor 10. In the absence of any air supply (i.e. pure steam reforming) the outflowing gas, following condensation of excess steam, was found to comprise 67% (by vol) hydrogen and about 25 vol % carbon monoxide: the temperature of the outflowing gas and the proportion of the diesel fuel which is reformed both increase with the microwave power that is provided. At a steam/carbon ratio of 3, diesel fuel was 89% converted using a microwave power of 2000 W while if the microwave power was reduced to 700 W, the diesel fuel conversion decreased to between 40 and 50%. The incomplete conversion of diesel fuel suggests the desirability of also providing a source of oxygen to provide additional heat through the partial oxidation reaction. When using air as the source of oxygen it is also necessary to increase the flow rate of gases through the plasma reactor 10 because of the dilution by nitrogen, which is inert.

Further experiments have been carried out on gas mixtures including both air and steam. These experiments focused on two values of the oxygen to carbon ratio ($O_2$:C): 0.5, at which hydrogen productivity is enhanced, and 0.7, to minimise the microwave power requirement and also to minimise the production of ethylene, other olefins, and acetylene. Further work has demonstrated that an $O_2$:C of 0.55 is particularly preferred. The absolute values of pressure were generally slightly above 2 atmospheres. Steam was generally added to provide a steam/carbon ratio of 2, to inhibit formation of carbon. The overall flow rate was 80 liters per minute in each case. For values of the oxygen/carbon ratio of above 0.5 it was found that all the fuel was converted.

It was found that ethylene was also a minor component of the outflowing gases (<1%), and as predicted this was more the case for the lower oxygen to carbon ratio of 0.5. This could be eliminated by providing a small volume of conventional reforming catalyst or specific ethylene removal catalyst at the outer end of the exit duct 24. The presence of a conventional reforming catalyst was found to be highly effective at removing ethylene, and also for increasing the hydrogen productivity, even though its volume was such that the space velocity of the gases through the catalyst was about 95,000/hr. The need for such a catalyst is less significant at the higher oxygen/carbon ratio of 0.7, when the hydrogen productivity is already higher because of the higher thermal energy associated with the more oxidising gas mixture, and the ethylene levels are lower. At the tail end of any such reforming catalyst, a water gas shift catalyst (e.g. chromium/iron oxides) may be provided to utilise the unreacted steam from the reformate stream, or alternatively a water gas shift reaction may be carried out using a separate catalyst unit (not shown).

The results, indicating the composition of the outflowing gases, and the experimental conditions, of such experimental runs are shown in the following table.

TABLE

|  | Run 1 | Run 2 | Run 3 |
|---|---|---|---|
| oxygen/carbon ratio | 0.50 | 0.70 | 0.70 |
| steam/carbon ratio | 2.0 | 2.0 | 2.0 |
| exit duct 24 contents | catalyst | — | catalyst |
| pressure/mbarg | 1100 | 1650 | 1100 |
| Carbon monoxide/% | 14.8 | 16.7 | 10.5 |
| carbon dioxide/% | 9.0 | 12.6 | 11.2 |
| hydrogen/% | 29.5 | 17.7 | 22.1 |
| oxygen/% | 0.5 | 0.2 | 0.5 |
| nitrogen/% | 46.2 | 52.8 | 55.7 |
| methane/% | 0.709 | 0.549 | 0.290 |
| ethylene/% | 0.133 | 0.045 | 0.002 |
| acetylene/% | 0.000 | 0.009 | 0.019 |
| ethane/% | 0.047 | 0.000 | 0.000 |
| carbon | no | no | no |
| Fuel conversion/% | 99.4 | 100 | 100 |

The residence time of the reactants within the plasma ball 40 is very short, being typically about 0.1 ms with this 80 slpm flow rate. Extending from the plasma ball 40 down the exit duct 24 is a plasma tail which is a high temperature luminous zone in which it can be expected that chemical reactions are occurring. The experiments carried out without a source of oxygen (with steam and diesel fuel only), as described above, were found to give short plasma tails only about 25 mm long, whereas the experiments in which oxygen was also present gave tails up to 230 mm long. The higher the steam loading, the shorter the tail; the higher the oxygen loading, the longer the tail. In the experimental conditions summarised in the table the residence time in the high temperature tail is about 4 to 5 ms.

The present invention has the advantage that complete fuel conversion can be achieved by a single pass of the fuel and gas mixture through the apparatus.

The observed results show that the hydrogen-generating apparatus 32 when operated as described above is very effective at generating hydrogen from diesel fuel; high conversions are obtained despite the short residence times, and this suggests that higher throughputs may be possible. If still larger throughput is required, it will be appreciated that this could be achieved by using a plurality of such microwave plasma reactors 10 through which the gas flows are in parallel. Alternatively, larger individual reactors with higher throughputs could be used with appropriate modification of the waveguide and wavelength of the microwave radiation entering the reactor.

As indicated above the optimum process ratios have been identified as: oxygen/carbon in the range 0.4 to 0.8, more preferably 0.5 to 0.7; steam/carbon in the range 1 to 4, more preferably 1.5 to 2.0. It will be appreciated that the experimental measurements described above were carried out without the optimum preheating of the reactants, as the heat exchanger 28 was not used. It is more thermally efficient to provide more preheating, although this should not exceed about 550° C., at which the diesel fuel would be expected to undergo thermal cracking, and must not exceed a temperature at which the materials defining the cavity 17 are damaged by the heat. Providing more thermal energy to the reactants by preheating ensures that the microwave energy is primarily used to create radicals and so to initiate chemical reactions, rather than being required to heat up the reactants. With preheating to 400° C. or 550° C. it would be expected that the microwave power requirement would be less, for the same overall conversion.

It will also be appreciated that the process, plant and apparatus described above may be modified in various ways while remaining within the scope of the present invention. For example the apparatus may also include burners or electrical heaters (not shown) to heat the water, air and diesel fuel to suitable temperatures; such heaters may for example be used during start-up. And further preheating of the reactants might be achieved by partial combustion (possibly using a catalytic reactor) of some of the diesel fuel before it is fed to the microwave reactor 10. In an alternative, at start-up, just air might be fed into the reactor 10 to initiate the plasma ball 40 and to provide a hot gas supply; once the heat exchangers 28, 29 and 30 had been heated up, water and diesel fuel could then be also supplied as described above. It will also be appreciated that the microwave reactor 10 may be modified in various ways. In particular, there might be other inlet ports provided in the insert 16c through which the reactant gases may be supplied, or there might be an inlet ports through the electrode 20, or again there might be means to inject reactants into the plasma tail within the outlet duct 24 or the downstream outlet pipe 26.

Figure 2:
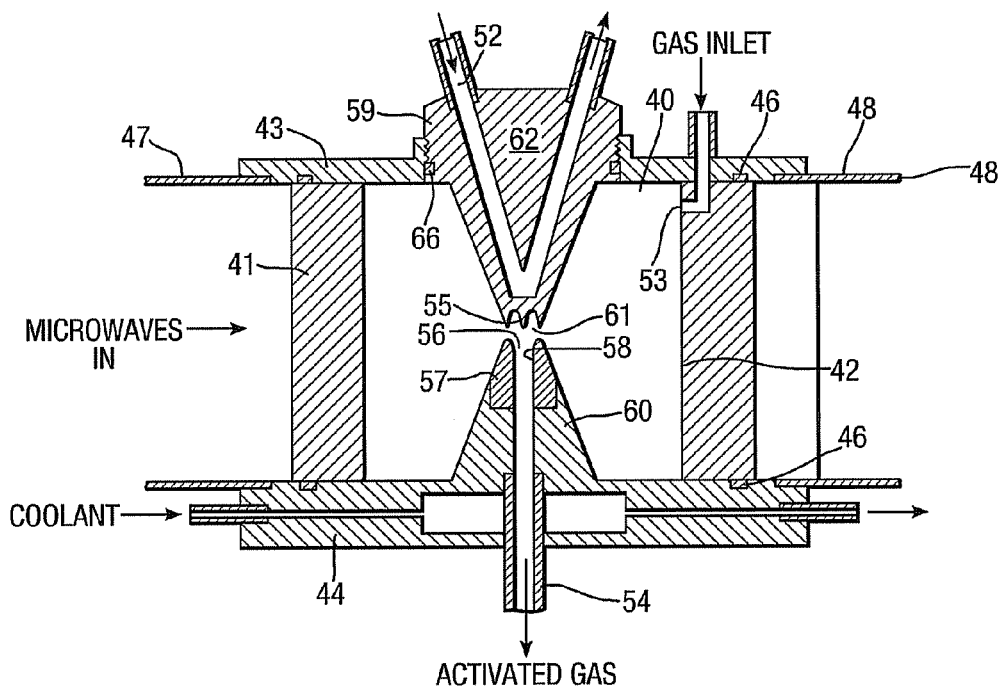
FIG. 2 shows a microwave plasma generator for use in the invention.

FIG. 2 shows a microwave plasma generator consisting of a chamber 40 consisting of a block 41 made of glass-reinforced polytetrafluoroethylene, and two end-pieces 43 and 44. The block 41 has a cylindrical inner surface 42 and a passage 53 which communicates with the gas inlet at one end and is tangential to the inner surface 42 of the block 41 at the other. Thus gas emerging into the chamber 40 formed by the block 41 and the end-pieces 43 and 44 does so tangentially and spirals around the electrodes 60 and 62 before entering the gap 61 between the electrodes 60 and 62. This spiral flow pattern increases the stability of the electric discharge between the electrodes 60 and 62, so enabling electrode tips of larger diameter to be used, with a consequent increase in the throughput of activated gas. For example, a diameter of 8 mm for the tip and orifice 56 of the passageway 54 in the electrode 60 and a gap 61 of 0.2 mm enables 100 shpm of gas to be activated. The discharge stability is increased further by means of a central projection 55 on the tip of electrode 62, and the flow of gas into the orifice 56 of the passageway 54 in the electrode 60 is enhanced by making the inner surface 58 of the orifice 56 trumpet-shaped. The electrode 60 is provided with a replaceable tip 57. Alternatively the electrode 60 may be a single piece (not shown).

Figure 3:
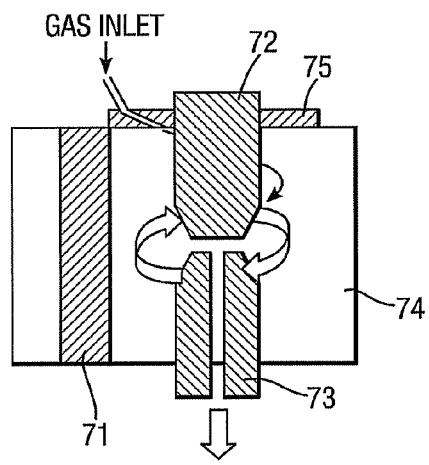
FIG. 3 is close up view of an embodiment of a gas inlet for a microwave generator used in the invention.

FIG. 3 shows a microwave plasma generator comprising of a chamber 74 consisting of a block 71 made of glass-reinforced polytetrafluoroethylene, and an end-piece at the top 75 and a second end-piece at the bottom (not shown). A gas inlet passes through the top end-piece 75 at an angle so as to produce a swirl of gas in the chamber 74 around the electrodes 72 and 73. The gas inlet may be straight or curved.

In a further embodiment (not shown) the microwave plasma generator of FIG. 3 can be assembled without the block 71. A swirl of gas still forms around the electrodes due to the angle and profile of the gas inlet. In another embodiment (not shown), the upper electrode 20, 62 or 72 could contain a further outflow duct for the gas mixture.

The invention claimed is:

1. A process for producing hydrogen from a hydrocarbon fuel, the process comprising:
   combining the fuel with a gas comprising oxygen and/or steam; and
   passing the fuel and gas mixture through a plasma generated by a microwave plasma generator between opposed electrodes in a reactor, at least one of the electrodes defining a duct for outflow of material from the vicinity of the plasma so that the gas mixture emerging from the outflow duct contains hydrogen, wherein the fuel and the gas comprising oxygen and/or steam enter the reactor so as to form a swirl of fuel and gas mixture around the electrodes.

2. A process as claimed in claim 1 wherein the fuel and the gas comprising oxygen and/or steam enter the reactor tangentially with respect to the electrodes.

3. A process as claimed in claim 1 wherein the fuel/gas inlets are tangential to the direction of motion of the fuel and gas mixture.

4. A process as claimed in claim 1 wherein the fuel is combined with a gas comprising both oxygen and steam.

5. A process as claimed in claim 1 wherein the hydrocarbon fuel is a diesel fuel.

6. A process as claimed in claim 1 wherein the proportions of fuel, oxygen and steam are such that the molar ratio of oxygen to carbon is in the range 0.5 to 0.7, while the molar ratio of steam to carbon is between 1.5 and 2.0.

7. A process as claimed in claim 1 wherein the fuel is supplied to the microwave plasma generator in a vapour form.

8. A process as claimed in claim 7 wherein heat to produce the steam and/or the vaporised fuel is obtained by heat exchange with the gas mixture emerging from the outflow duct.

9. A process as claimed in claim 1 wherein pulsed microwave power is supplied to the reactor.

10. A process as claimed in claim 1 wherein complete fuel conversion is achieved by a single pass of the fuel and gas mixture through the apparatus.

11. A process as claimed in claim 1 wherein the reactor is operated at a higher pressure than atmospheric pressure.

12. A process as claimed in claim 1 wherein the opposed electrodes are capable of being moved closer together and further apart, with respect to each other.

* * * * *